United States Patent [19]

Lindenthal

[11] Patent Number: 5,667,331

[45] Date of Patent: Sep. 16, 1997

[54] SHAFT-HUB JOINT FOR TRANSMISSION OF TORQUE BETWEEN TWO EQUIAXIAL MACHINE PARTS

[75] Inventor: Hans Lindenthal, Heidenheim, Germany

[73] Assignee: J.M. Voith GmbH, Germany

[21] Appl. No.: 288,290

[22] Filed: Aug. 10, 1994

[30] Foreign Application Priority Data

Aug. 11, 1993 [DE] Germany ............... 43 26 861.7

[51] Int. Cl.⁶ .................... F16D 1/02; F16D 7/02
[52] U.S. Cl. .................... 403/359; 403/1; 403/41; 403/327; 464/162
[58] Field of Search ................... 403/1, 41, 327, 403/328, 359; 464/37, 162, 167, 168

[56] References Cited

U.S. PATENT DOCUMENTS

| Re. 28,355 | 3/1975 | Petri | 403/328 |
|---|---|---|---|
| 2,220,610 | 11/1940 | Miller | 403/328 X |
| 2,514,228 | 7/1950 | Dodge | 464/37 X |
| 3,073,192 | 1/1963 | Beers | 403/328 X |
| 3,475,043 | 10/1969 | Anderson | 403/328 X |
| 3,827,816 | 8/1974 | Knapp et al. | 403/359 X |
| 4,344,516 | 8/1982 | Kolb | 403/328 X |
| 4,392,759 | 7/1983 | Cook | 403/327 X |
| 4,411,637 | 10/1983 | Rauch | 464/180 |

FOREIGN PATENT DOCUMENTS

| 574365 | 12/1993 | European Pat. Off. | 403/1 |
|---|---|---|---|
| 1854247 | 1/1962 | Germany . | |
| 187777 | 6/1963 | Germany . | |
| 2923902 | 1/1980 | Germany . | |
| 4124152 | 1/1993 | Germany | 403/1 |
| 552801 | 8/1993 | Germany . | |
| 2023250 | 12/1979 | United Kingdom . | |

Primary Examiner—Blair Johnson
Assistant Examiner—Andrea Chop
Attorney, Agent, or Firm—Baker & Daniels

[57] ABSTRACT

The invention concerns a shaft-hub joint between two equiaxial machine parts for transmission of high torques in a power train—a first machine part on the power input end and a second machine part of the power output end. The machine parts are joined to each other in a fashion movable relative to each other but rotationally fixed, and a positive-locking overload relief mechanism is provided between the machine parts, the individual locking elements of which are pre-stressed in the sense of locking. The overload relief mechanism locks the two machine parts against axial thrust up to a specific adjustable limit value whereby the positive locking will be eliminated when the limit value is exceeded. The interlocking elements comprise bolts with a head surface beveled in wedge fashion.

3 Claims, 4 Drawing Sheets

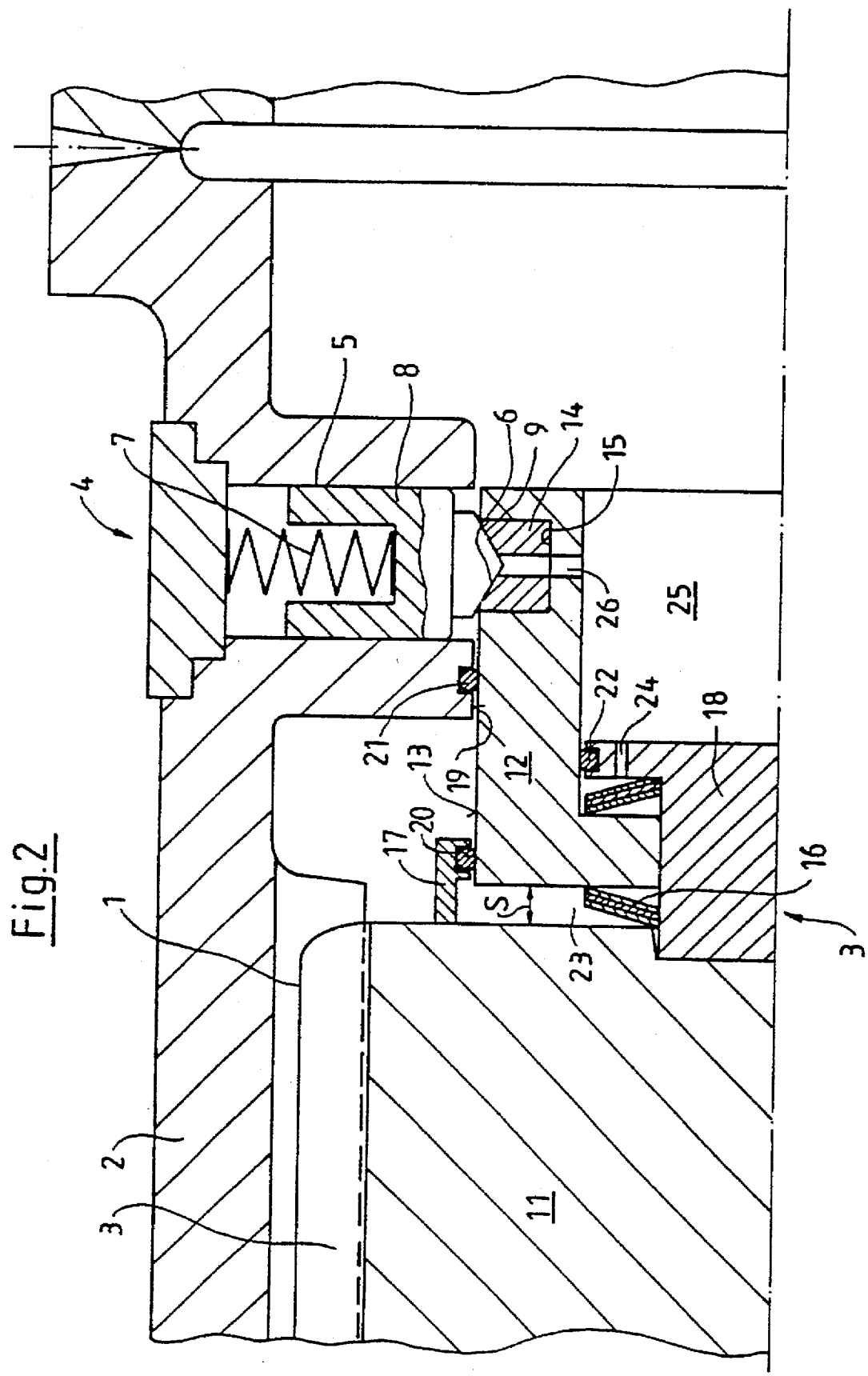

FIG_4a
FIG_4b

SHAFT-HUB JOINT FOR TRANSMISSION OF TORQUE BETWEEN TWO EQUIAXIAL MACHINE PARTS

BACKGROUND OF THE INVENTION

The invention concerns a shaft-hub joint for transmission of torques between two equiaxial machine parts.

It is known that in power trains, for example such for use in rolling mills where the torque generated by the motor is transmitted via shaft trains—in a rolling mill, e.g., the working roll is powered through a jointed shaft—disturbances on the machine end being driven due to which a transmission of torque from the power input to the power output may be interrupted at continued operation of the power source cause a deformation in the power train, due to torsion, and eventual torsional fracture. The torsional fracture shows in the extreme case a fracture pattern of 45° to the axis of torsion, due to the tensile stresses occurring in twisting. In the case of the rolling mill, for example, torque transmission between the power source and working roll is interrupted in the case of working roll jamming. Subsequent to the fracture, i.e., in the example after separation of the working roll from the power source and with simultaneous continued operation of the power source, the fracture face on the side of the drive train that is still joined to the power source is twisted relative to the now stationary fracture face located on the side of the working roll. Due to the superimposition of the fracture faces and due to the differences in inertia and speed of rotation between the parts of the power train that have been created by the fracture—the one connected to the power source and that joined to the working roll—the part joined to the power source undergoes an axial shift in its own direction. The continued drive motion imparted by the motor and the obliquely fashioned fracture lead generally to the occurrence of high axial forces which bring about a positional shift of individual elements of the power train, in the extreme case a heaving of the components out of their anchoring.

A known solution for avoidance of such incidents consists in fashioning the joint between power source and element being driven, not integrally in the form of a shaft train, but in at least in two parts, and to join these two parts in such a way that the torque transmission will be realized while also appropriate overload relief mechanisms are allowed to become effective which at high axial forces interrupt the transmission of torque. In the prior solutions, an element is used as a safety clutch which also functions as the rotationally fixed joint between the two parts, for example the two parts of the shaft train. The safety clutch serves the transmission of high torques and is provided with a system for torque limitation, such as is known for instance from DE 29 23 902.

This clutch comprises at least one thin-walled sleeve forming an axially extending wall of an essentially annular chamber which can be acted upon by a pressure medium so as to deform the sleeve essentially elastically in the radial direction and cause it to bind with a surface of an element on which the clutch is mounted. There are two options available for that purpose. In one option, the clutch becomes effective between the two machine parts to be joined, in that the clutch is designed as a bushing that consists of two sleeves welded to each other and whose cavity can be acted upon by a pressure medium, deforming the sleeves radially and locking the two machine parts onto each other. In the second option, the clutch embraces both machine parts and causes frictional engagement between both by deformation of only one sleeve. Bordering on the annular chamber is a duct arrangement with which a safety or clutch relief mechanism is coordinated. The relative motion between the surfaces of the two machine parts which are to be joined by frictional engagement or a specific torsional deformation of same can be caused to enter a state in which the pressure medium contained in the annular chamber can escape from it through the duct arrangement, thereby relieving the annular chamber. Hence, the clutch is adjusted to the desired torque of release. If this torque is exceeded due to an overload, slippage of the clutch occurs. The transmitted torque diminishes, since the effective coefficient of adhesive friction transforms to a coefficient of sliding friction. A relative motion between the shaft and hub takes place in the peripheral direction. Mounted for instance on the shaft, a shear ring shears off a shear valve which communicates with the duct arrangement or the annular chamber of the clutch.

With the shear valve(s) sheared off, the highly pressurized oil can expand freely, and the transmittable torque drops within a few milliseconds to zero.

To safeguard against axial force overloads, the clutch is adjusted to an appropriate admissible axial force to be transmitted, i.e., the internal pressure of the annular chamber is so set that with it the frictional engagement can be maintained only up to the level of the critical axial force. As the admissible axial force is exceeded, for example due to a fracture, the frictional engagement is eliminated and supplanted by a relative motion in the axial direction between the clutch and the elements joined to it. The disadvantage of this embodiment is that the clutch must be set to an appropriate axial force and designed accordingly. A simultaneous transmission of high torques with the same clutch can be realized only in rarest cases, since the surface pressures between clutch, shaft and hub that are required from transmission of the desired torque and the still admissible axial force may vary from one another depending on conditions of application. Owing to the equality of the forces that are required for elimination of the frictional engagement in the peripheral direction and in the axial direction, and owing to the desire to actuate the clutch relief mechanism at axial forces that are already relatively low as compared to the peripheral force, only low torques can be transmitted with clutches of such design.

Another option is relieving in the case of such a clutch the system for torque limitation, i.e., for release of the frictional engagement, at a selected axial force, by measuring the magnitude of the axial forces and transforming the measured value to a signal for release of the safety mechanism for torque limitation. But this option is characterized by a very high metrological and control expense, since the response times must be very short.

Therefore, the problem underlying the invention is to so advance a shaft-hub joint of the general type just described such that the aforementioned disadvantages will be eliminated. The shaft-hub joint should be suited for transmission of high torques, for instance for use with jointed shafts or universal shafts, and the overload relief mechanism is to be able to react to already low axial forces.

The structural conversion should be such that the overload relief mechanism will respond at a specific magnitude of the effective axial force. In doing so, the emphasis is on a low-cost realization of structure and function, with a small number of components of simple design. The entire arrangement is meant to excel by having a low manufacturing and assembly expense as well as simple and quick resetting after a response event.

SUMMARY OF THE INVENTION

This problem is solved by providing a positive-locking overload relief mechanism comprising at least one interlocking element provided between the machine parts locking the machine parts against axial thrust up to a given adjustable limit in value, wherein positive locking is eliminated when the limit value is exceeded. The interlocking element comprises a head having surfaces beveled in wedge fashion viewed in cross section, the interlocking element being supported by the first machine part and pressed by a prestress force into a receiving recess in a surface of the second machine part.

The previously known two-part design of a joint between power source and element to be driven, in the form of a rotationally fixed joint between the two parts, is replaced by a rotationally fixed joint with axial length equalization. The additional employment of an overload relief mechanism which responds only upon exceeding an adjustable limit value of a specific axial force magnitude makes it possible to avoid in the case of a fracture or very high axial forces a high stress upon the individual elements of the power train. The axial force is compensated for by the shift of the two machine parts relative to each other by means of the axial length equalization, which is triggered by the action of the overload relief mechanism. Bolts or pins with a head surface beveled in wedge fashion are used as interlocking elements. For example, the entire head may be conic or the head surface may be wedge-shaped only in cross-sectional view. The bolts themselves may be fashioned differently; for example, they may have a circular or square cross section in the end view.

The interlocking elements are supported by one of the two machine parts—for instance by the first machine part—and forced into mating receiving recesses in the other part, presently in the second machine part. The geometry of the interlocking elements enables transmission of high axial forces, which in comparison to conventional interlocking elements expresses itself in size reductions. The complementary wedge-shaped recesses impose on the manufacturing and assembly accuracy lower requirements than in the case of other positive-locking joints, since these joints are capable of equalizing variations up to the millimeter range.

Furthermore, a more exact adaptation is possible to specific axial forces that must not be exceeded. The use of bevel bolts, therefore, is characterized by reduced wear and greater availability of the entire overload relief mechanism.

The number of interlocking elements and/or the change in geometry—specifically of the bevel angle—and/or the magnitude of the prestress force for the interlocking elements allow adjusting the limit value of the axial force; exceeding said limit value causes a response of the overload relief mechanism, that is, the shift of the two machine parts relative to each other.

The split design of the second machine part chosen in a preferred embodiment—i.e., subdividing the second machine part in two sections where the first section is joined to the first machine part directly by rotationally fixed joint, but with the option of axial length equalization, and where the second section (signified only as a hollow body in the example) is joined directly only to the interlocking elements of the overload relief mechanism, and indirectly to the first section—enables the provision of a curtailed axial shiftability between the two sections. Damping elements, specifically spring elements, are preferably provided between the two sections.

The split design with the option of a reduced axial backlash between the two sections and the arrangement of spring elements, preferably disk springs, between these two sections offer several advantages:

1) The overload relief mechanism, specifically the interlocking elements, are extensively kept free of dynamic stresses.
2) Axial shifts due to axial forces of a magnitude smaller than the adjusted limit value of the axial force are compensated for, or damped.
3) The interlocking elements have in idling no centering effect on both machine parts.

The spring elements between the two sections of the second machine part are arranged in a sealed space featuring at least two lubricant channels—a lubricant feed channel and a lubricant removal channel. During operation, the space is filled with a lubricant, preferably grease. At an axial shift caused by a high axial force and leading to a response of the overload relief mechanism, the lubricant proceeds via the removal channel to the interior of the second section and from there, due to centrifugal force effect, to channels which communicate directly with the receiving recesses in order to lubricate the appropriate receiving recess surfaces at the moment of their disengagement.

Usable as interlocking elements include in this case also cylinder rollers, balls or bolts (pins) with an oblique bevel surface (bevel bolts), with the latter enjoying preference because the axial forces are transmitted here to the bevel bolt via large surfaces, whereas high Hertz stresses occur when using cylinder rollers and balls, due to the point or line contact. Therefore, using bevel bolts is characterized by low wear and greater availability of the entire overload relief mechanism. Bevel surfaces and complementary V-shaped recesses involve requirements on the manufacturing and assembly accuracy that are less stringent than with other positive-locking joints, because they are able to compensate for variations up into the millimeter range.

BRIEF DESCRIPTION OF THE DRAWINGS

The solution to the problem according to the invention will be illustrated hereafter with the aid of the figures, which in detail show the following:

FIG. 2 shows schematically another embodiment of an inventional arrangement for safeguarding against axial force overloads;

FIGS. 4a and 4b are sectional views of two different configurations of the recesses.

DETAILED DESCRIPTION

Figure 1:
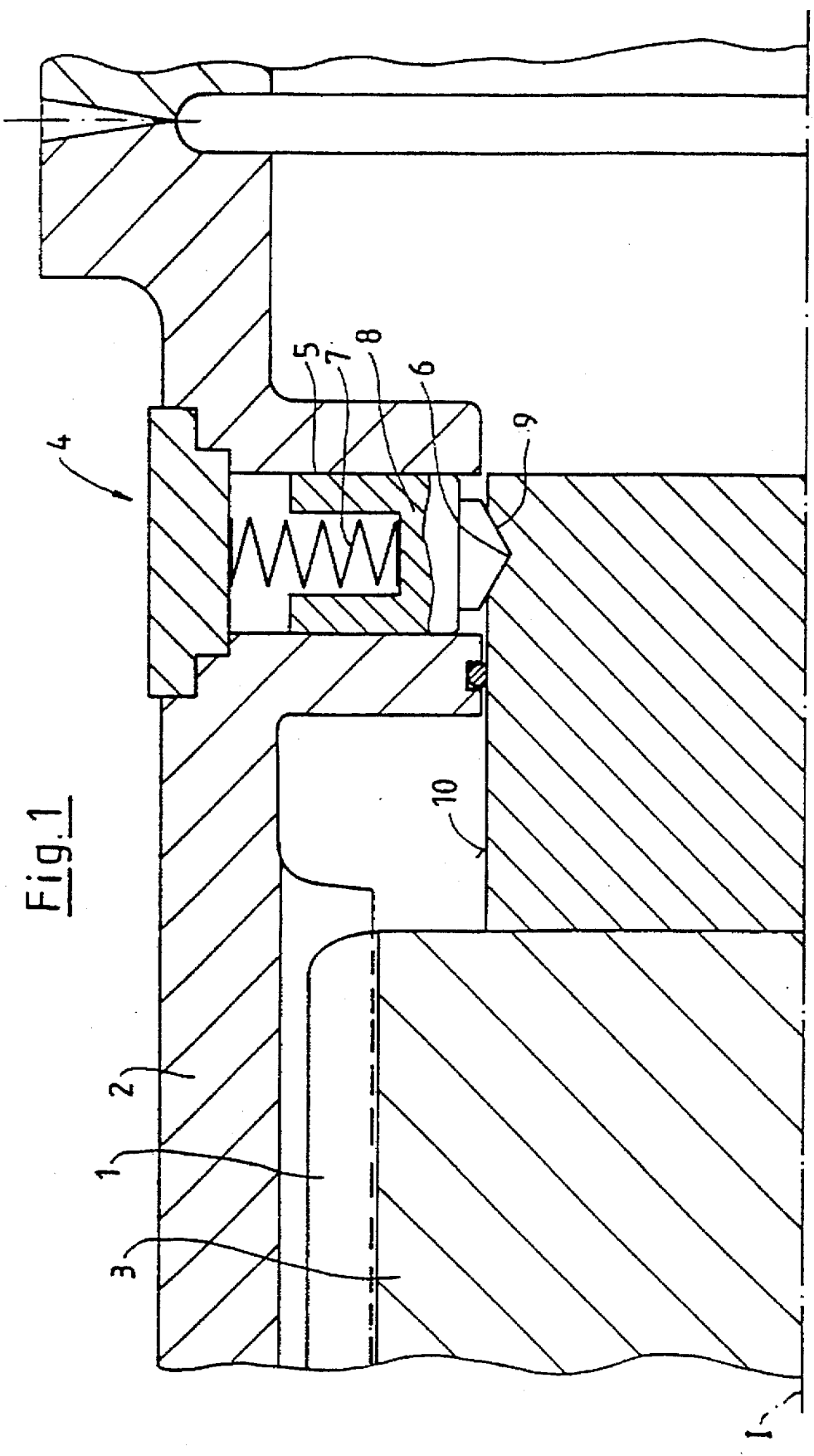
FIG. 1 illustrates schematically the basic principle of a positive-locking overload relief mechanism against axial overload with the simultaneous option of transmitting high torques.

FIG. 1 shows a shaft-hub joint 1 for transmission of torques between the equiaxial machine parts—a first machine part 2 and a second machine part 3—and for realization of axial length equalization. To that end, the shaft-hub joint 1 is fashioned here as a spline joint with sliding fit. The additional arrangement of an overload relief mechanism 4 allows the axial movability within the shaft-hub joint 1 only at a specific magnitude of axial force.

The overload relief mechanism 4 is comprised of at least one interlocking unit 5 installed in one of the two machine parts, presently in the first machine part 2. The interlocking unit is composed of an interlocking element 6 and, in the simplest case, a spring 7 and a stop 8 that limits the possible prestress force of the spring 7 while forming a structural unit with the interlocking element 6. The spring 7 forces said interlocking element 6 into a mating receiving recess or groove 9 on the second machine element, thus entering with it into a positive-locking joint. The latter serves to absorb axially directed forces; peripheral forces are not transmitted thereby. Recess 9 can be an annular groove, an elongate or short groove or a recess matching the contour of element 6. In all cases the recess is bevelled when viewed in cross-section.

The number of interlocking elements 6 engaging the machine part 3 on its periphery 10 and the adjusted prestress of the springs 7 determine the magnitude of the axial forces that causes the elimination of the positive locking, that is, the components of the axial force counteracting the prestress force of the spring(s) and leading to the elimination of the frictional engagement, always depending on the bevel angle.

Concurring with an axial shift of the second machine part 3, the interlocking elements 6 shift upon exceeding of the preselected limit value of the axial force radially outward, that is, away from the center axis I of the two machine parts, thus imparting a further prestress to the springs 7. The interlocking element 6 shifts according to the shift of the second machine part 3 against the first machine part 2. The motion of each individual interlocking element 6 continues in this simple case until the stop 8 arrives at its limit position, respectively the interlocking element has slipped out of its receiving recess 9. The axial shift of the machine part 3 toward machine part 2 is made possible by the axial length equalization by the spline joint 1 with sliding fit.

The explanations to FIG. 1 presuppose that the second machine part 3 is located on the power output side and thus shifts in axial direction against the first machine part 2, which is at least indirectly connected to the power source. However, also the opposite case is possible—the first machine part 2 shifts against the second machine part 3 in axial direction.

The design of the interlocking unit 4 may vary greatly. As interlocking elements 6, bolts with a head beveled in wedge fashion are given preference, since they allow realizing at the points of force transmission a large-area contact, which ultimately expresses itself in reduced wear as compared to using balls or cylinder rolls, which allow only a point contact or line contact at the contact locations in the receiving recesses. The receiving recesses 9 pertaining to the interlocking elements 6 are preferably wedge-shaped or coniform depending on the form of the head of the bolts or pins 6.

The prestress force is preferably applied through spring elements, here a spring 7, the path of the spring element 7 being limited in the illustrated example by the stop 8 in the event of response.

An appropriate design of the interlocking unit 4 contributes to preventing the interlocking elements 6 from sliding back into the receiving recesses 9. An example of an option for such design is previously known from a reprint from "Stahl und Eisen" 108 (1988) No. 14/15.

Owing to the low manufacturing expense, spline joints with sliding fit are preferably used to realize a rotationally fixed joint between a first and second machine part with axial length equalization option. Conceivable as further options, however, are also telescopic designs on antifriction bearings or ball guides.

FIG. 2 shows schematically another embodiment of the inventional arrangement for torque transmission with axial force limitation. The overload relief mechanism in this embodiment is arranged between the first, 2, and second machine part, 3, with the first machine part 2 supporting at least one interlocking unit 4. The basic structure matches that described in FIG. 1, for which reason same references are used for identical components. The second machine part 3, however, is of a two-part design. The counterpart required for form-fit is arranged on a first section 12 of the second machine part 3, which is indirectly joined to the second section 11 of the second machine part 3, but has, or allows, a slight axial backlash s relative to it. Called a hollow body here, this first section 12 features on its outer circumference 13 the recesses 9 for receiving the interlocking elements 6. Receiving recesses 9 are exposed to high stress and thus wear, and therefore an appropriate surface treatment is suitable. For manufacturing and cost reasons, the receiving recesses 9 thus are preferably machined into separate inserts 14 which are somewhat larger than the receiving recesses 9 and arranged on the outer circumference of the hollow body. The inserts 14 are then subjected to a separate surface treatment. Normally they are heat-treated, preferably hardened.

The inserts 14 are arranged in corresponding recesses 15 in the outer circumference 13 of the hollow body, and at that, preferably in a way such that the outside surface of each insert is flush with the outer circumference 13 of the hollow body 12.

Another option provides only one insert 14 in the form of a two-part ring into which the receiving recesses 9 are machined; also conceivable is accommodating the interlocking elements in a preferably V-shaped slot machined into the two-part ring. The hollow body 12 features then a ring-shaped recess 15 extending along the circumference 13 for receiving the insert.

In this embodiment, spring elements 16, preferably dish springs, are arranged between hollow body 12 and second section 11. This arrangement of the spring elements 16 along with the two-part design of the second machine part offers several advantages:

1) Keeping the interlocking elements 6 free of dynamic stresses;
2) Damping in idling and, e.g., during roll change when used in rolling mills;
3) Compensation of small axial strokes.

The hollow body 12 is arranged in such a way that it fits between two components 17 and 18 forming an assembly with the second section 11 of the second machine part 3 and an inside surface 19 of the first machine part 2. A seal is provided at each of the guidance points 20, 21 and 22.

The springs 16 are thus contained in a sealed space 23. Coordinated with the latter is at least one lubricant feed line, not illustrated here, and one lubricant drain line referenced 24. The arrangement of the lubricant channels is such that the surfaces of the receiving recesses 9 will be lubricated whenever an interlocking element 6 disengages the recess. In the embodiment, slight axial forces are absorbed via the dish spring arrangement 16 between the two sections 11 and 12 of the second machine part 3, utilizing the axial shift option of the second section relative to the first. In the case of high axial forces, the two sections 11 and 12 shift jointly once the axial shift distance s has been exceeded and the overload relief mechanism responds. The interlocking elements 6 slide completely out of the receiving recesses 9 and sweep in disengaged state across the outer circumference 13 of the hollow body 12. The lubricant proceeds through the lubricant drain channel 24 into the interior 25 of the hollow body 12 and from there, by centrifugal force, through a channel 26 extending through the hollow body wall and through the insert 14 up into the receiving recess 9, to the surfaces of the latter.

For the sake of clarity, the embodiment illustrated in FIG. 2 is shown only schematically without illustrating details and conversion options. Further design details not impairing the function of the embodiment are possible and may be selected in keeping with known application requirements. Such design of a two-part form of the second machine part is generally possible with any shaft-hub joint featuring a positive-locking overload relief mechanism against axial force. Chosen as interlocking elements, e.g., may be bevel bolts, cylinder rolls, ball-shaped elements etc.

The design of the interlocking unit 4 conforms always to the conditions of use and the functions to be fulfilled. The embodiment illustrated in FIG. 1 is only an example. Conceivable as well is the use of other previously known interlocking units with the same basic principle.

Figure 3A:
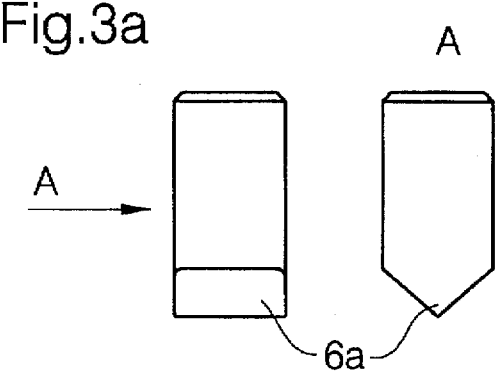
FIGS. 3a–3d are side elevational views of various configurations of the interlocking element wherein each figure shows the element in orientations displaced 90° from each other.
Figure 3B:
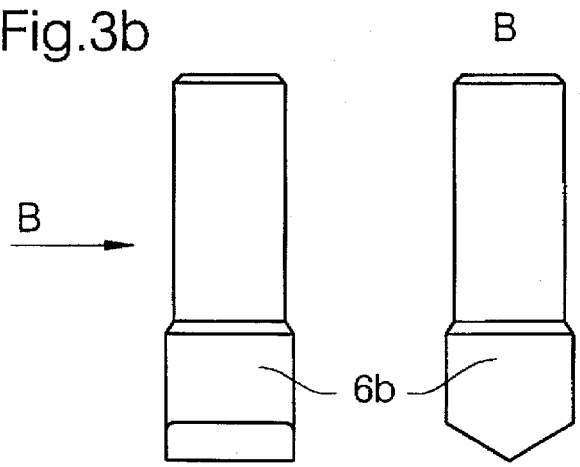
Figure 3C:
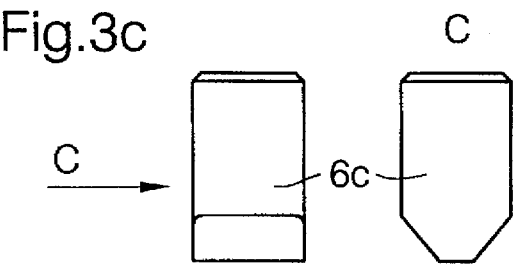
Figure 3D:
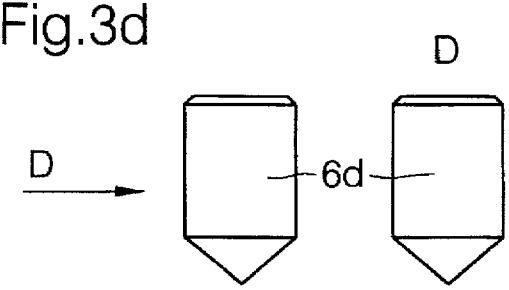

FIGS. 3a through 3d show examples for the design of interlocking elements 6a–6d in the form of bolts having bevelled head surfaces. The bevelled surfaces may converge into a wedge (FIGS. 3a through 3d), and the head may be fashioned, as shown in FIG. 3c, as a truncated wedge surface. FIG. 3d shows the option of fashioning the bolt 6d with a conic head. The figures illustrating side elevational views of the various interlocking elements, i.e., FIGS. 3a–3d, show each interlocking element in two orientations displaced 90° from each other. The arrows labelled A, B, C and D on the left-hand side of each figure are directed at the side elevation illustrated below the respective letters A, B, C and D located above the interlocking element shown on the right-hand side of each figure.

FIGS. 4a and 4b show possible designs of the mount, with the recess in cross section. These have cross-sectionally a coniform taper. The mount in FIG. 4a is suited for receiving bolts relative to FIGS. 3a, 3b, 3c; the mount in FIG. 4b for styles according to FIG. 3c. The bolts themselves, except for the head, may be designed circular or multipointed in plan view.

The basic principle described here can be employed in any application calling for torque transmission and safeguarding against axial force, for instance in power trains that include jointed shafts or in the case of jointed or universal shafts. The structural design in detail and the adaptation to particular applications are within the discretion of one skilled in the art.

What is claimed is:

1. A shaft-hub joint between two equiaxial machine parts for transmission of high torques in a power train, a first said machine part being on a power input end and a second said machine part being on a power output end, wherein the two machine parts are joined to each other in a fashion movable relative to each other but rotationally fixed relative to each other, said joint comprising:

a positive-locking overload relief mechanism comprising at least one interlocking one element provided between said machine parts locking said machine parts against axial thrust up to a given adjustable limit value wherein positive locking is eliminated when the value is exceeded:

said interlocking element comprising a head having surfaces beveled in wedge fashion viewed in cross section, said interlocking element supported by said first machine part and pressed by a prestress force into a receiving recess in a surface of the second machine part, said receiving recess machined into a heat treated insert forming an assembly with the second machine part.

2. The shaft-hub joint according to claim 1, wherein said insert is a multi-part ring.

3. A shaft-hub joint between two equiaxial machine parts for transmission of high torques in a power train, a first said machine part being on a power input end and a second said machine part being on a power output end, wherein the two machine parts are joined to each other in a fashion movable relative to each other but rotationally fixed relative to each other said joint comprising:

a positive-locking overload relief mechanism comprising at least one interlocking element provided between said machine parts locking said machine parts a against axial thrust up to a given adjustable limit value, wherein positive locking is eliminated when the value is exceeded:

said interlocking element comprising a head having surfaces beveled in wedge fashion viewed in cross section, said interlocking element supported by said first machine part and pressed by a prestress force into a receiving recess in a surface of the second machine part;

said second machine part having two sections which are joined to each other indirectly and have an axial backlash relative to each other; and at least one damping element comprising a dish spring arranged between said sections.

* * * * *